Nov. 2, 1926.  
J. F. MERKEL  
1,605,680  
FRAME FOR MOTOR CYCLES  
Filed Nov. 3, 1924
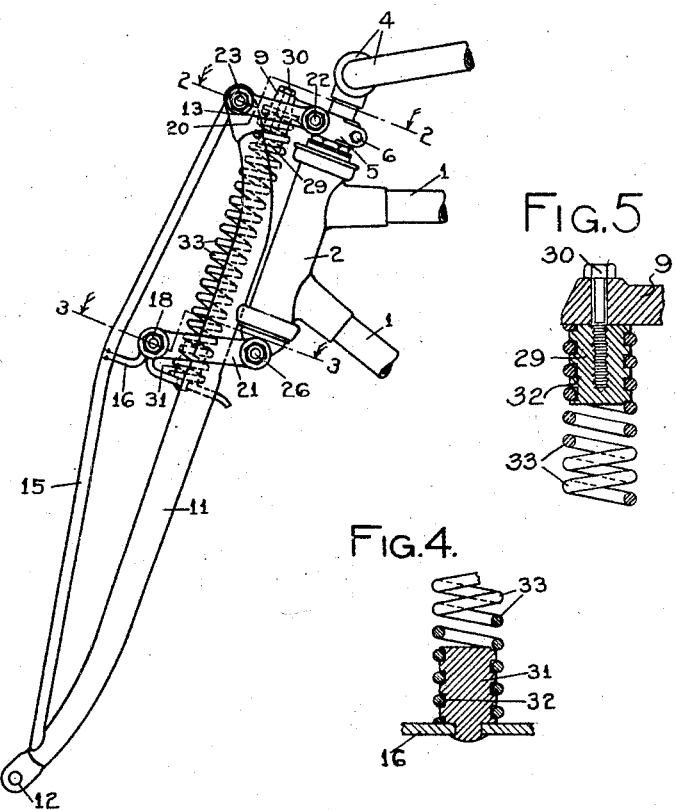
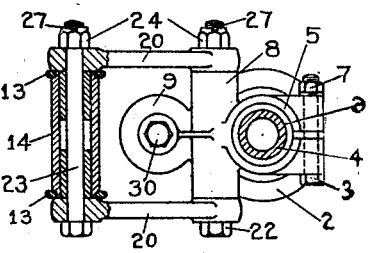
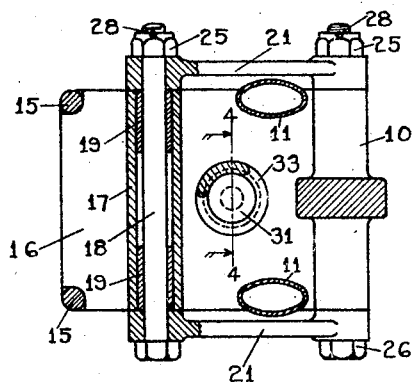
INVENTOR  
J. F. Merkel.  
BY Neil D. Preston  
his ATTORNEY Patented Nov. 2, 1926.

1,605,680

UNITED STATES PATENT OFFICE.

JOSEPH FRED MERKEL, OF ALBANY, NEW YORK, ASSIGNOR TO G. R. S. PRODUCTS COMPANY, INC., OF ALBANY, NEW YORK.

FRAME FOR MOTOR CYCLES.

Application filed November 3, 1924. Serial No. 747,548.

This invention relates to improvements in frames for motorcycles, and more specifically concerns a spring connection between the front fork and the steering head of the frame of a motorcycle or like vehicle.

In cycle construction, it is desirable to provide means for yieldingly transmitting the load on the frame to the front fork and wheel, and to absorb shocks or blows delivered to the wheel in passing over uneven roads, as well as to check the rebound of the frame which results from such shocks.

It is an object of the present invention to provide a movable resilient connection between the front fork and the steering head of a cycle frame, which connection employs one spring member only to perform the function of cushioning the frame from shocks and of checking the rebound of the frame.

It is another object of the present invention to provide a spring fork of simple and durable mechanical construction which may be cheaply and easily manufactured.

Other objects and advantageous features of the present invention will become apparent as the description thereof progresses.

In the drawings, Figure 1 represents a side elevation of the spring fork of the present invention shown attached to the steering head of a motorcycle frame;

Figure 2 is a sectional view taken along the line 2—2 of Figure 1;

Figure 3 is a sectional view taken along the line 3—3 of Figure 1;

Figure 4 is a section through the spring and spring supporting stud taken along the line 4—4 of Figure 3; and Fig. 5 is a section through the upper spring end support and spring supporting stud.

Referring to Figure 1, a portion of the usual motorcycle or bicycle frame has been shown, the frame members 1 being connected to the head portion 2 by sleeve joints. The head 2 carries the steering spindle 3 which is rotatably mounted in the head 2 by means of suitable bearings, and carries the usual handlebar structure 4.

A split clamping collar 5 is secured to the steering spindle 3 at a point just above the head portion 2 by means of the bolt 6 and the nut 7 as shown. Integral with this collar 4, is a horizontally extending tubular sleeve 8 and a spring end support 9. The extreme lower end of the steering spindle 3, which extends below the head 2, has fixed to or integral therewith, a horizontally extending tubular sleeve 10 as clearly shown in Figures 1 and 3.

The front fork proper comprises two fork members 11 of oval cross-section which are arched in the manner shown. The extreme lower ends of the fork members 11 are flattened and drilled at 12 to receive the front axle or spindle, not shown, and the extreme upper ends of these fork members are flattened and drilled in a similar manner at 13, and are pressed or otherwise suitably secured to a tubular sleeve 14. The fork members 11 are braced and strengthened by means of the truss members 15 of circular cross section, which are welded to the fork members near their upper and lower extremities as shown. A bearing plate or support 16 is welded to the fork members 11 and the truss members 15 at a point just above their mid-portion as shown. This plate 16 serves to brace the fork and truss members apart, and also acts as a support for the spring and link structure by means of which the fork is secured to the steering spindle 3. The plate 16 is provided with an upwardly extending tubularly bent sleeve portion 17, shown in Figures 1 and 3, which carries a bolt 18; bearing bushings 19 of bronze or other suitable material being carried between the bolt 18 and the tubular portion 17.

The fork structure is secured to the steering spindle by means of the links 20 and 21. Bolts 22 and 23 are passed through the sleeves 14 and 8 and carry the links 20; and similar bolts 26 and 18 pass through the sleeves 17 and 10, and carry the links 21; these bolts 22, 23, and 18, and 26 being provided with castellated nuts 24 and 25, and pins 27 and 28 to allow for their adjustment against wear.

The nuts 24 and 25 are drawn up to an extent to permit the free motion of the links 20 and 21 but to prevent any end play between these links and the corresponding sleeves. The fork structure and steering spindle are thus connected in such a manner as to allow a free parallel motion in a vertical plane, while having a rigid lateral connection which permits the entire spindle assembly to be rotated around the axis of the spindle in the steering movement.

The spring end support 9, which is integral with the clamping collar 5, carries a spring supporting stud 29, which is secured to the support 9 by the machine screw 30 as shown in Fig. 5. A similar spring supporting stud 31 is riveted or otherwise suitably secured to the plate 16 in such a position that the studs 29 and 31 are directly in line when the fork structure is in its normal riding relation to the frame. These studs 29 and 31 are provided with helical grooves 32, preferably of a rectangular section as clearly shown in Figures 4 and 5. A coiled spring 33, constructed of heavy spring steel, is rigidly secured to the studs 29 and 31, the ends of this spring screwed into the engagement with the helical grooves 32.

From an inspection of the construction described, it is evident that the spring 33 will support the frame of the cycle and will act to cushion the frame against shocks delivered to the front fork in passing over uneven roadways. It will also be noted that as the ends of the springs 33 are firmly secured to the fork structure and to the steering spindle, the spring will act to prevent a rebound. That is, when the front wheel strikes a depression in the roadway and is thrown upwardly, carrying the frame structure with it, the spring 33 will be tensioned as the inertia of the frame tends to carry the fork and wheel off the road, and the rebound will thereby be checked.

Since the spring supporting studs 29 and 31 are maintained in a parallel and substantially axially aligned relation, the stresses in the spring 33 due to its compression will be uniformly distributed, and the tendency of the spring to buckle or bend out of alignment is very slight. If the spring should break, the axial relation of the spring supporting studs maintains the broken ends in contact and so prevents the frame structure from being dropped down into contact with the revolving front wheel, thereby bringing the cycle to an abrupt stop and endangering the driver.

As the spring supporting means comprising the present invention has been described in a rather specific manner, and in connection with a specific frame and fork structure, it should be clearly understood that the invention is not limited in its scope to the exact construction shown and described, and further that many changes and modifications might be made without departing from the scope of the invention as defined by the appended claims.

What is desired to secure by Letters Patent is:—

1. A resilient connection between the fork and the frame of a cycle comprising relatively movable fork and frame structures, and a single spring for yieldingly resisting relative motion in either of two directions between said structures.

2. In a spring fork for cycles and the like, rigid fork structure, steering spindle, links connecting said fork structure and spindle for parallel movement in a vertical plane, and a single spring having its opposite ends rigidly secured to said fork structure and said spindle respectively.

3. In a fork for cycles and the like, a fork structure comprising fork members and truss members, a plate extending between said members and substantially at right angles thereto, a sleeve member formed integral with said plate, and means including a bolt passing through said sleeve member for securing said fork structure to the steering spindle of a cycle frame.

4. In a fork for cycles and the like, a fork structure comprising fork members and truss members, a plate extending between said members and substantially at right angles thereto, a sleeve member and a spring supporting stud carried by said plate, means including said sleeve member and movable links for connecting said fork structure to the steering spindle of a cycle frame, a spring supporting stud secured to said steering spindle, said spring supporting stud having helical grooves therein, and a coiled spring attached to said supporting studs and engaging said grooves.

5. In a spring fork for cycles, a fork structure and a steering spindle, means comprising substantially parallel link members for movably connecting said fork structure and said steering spindle, a single spring member having its opposite ends rigidly secured to said steering spindle and said fork structure respectively for resisting relative movement in either of two directions, between said fork structure and said steering spindle, and a plate rigidly secured to said fork structure and carrying means for securing one end of said spring member and one of said link members to said fork structure.

6. In a device of the character described, a fork structure comprising rigidly connected fork members and truss members, a plate rigidly secured to said fork and truss members, and lying in a plane substantially at right angles thereto, said plate having an upwardly extending portion forming a sleeve, a bolt passing through said sleeve, and means including link members engaging said bolt for movably securing said fork structure to a cycle frame.

7. In a spring fork for cycles, a fork structure comprising rigidly connected fork members and truss members, a plate formed with a substantially cylindrical sleeve thereon rigidly secured to said fork and truss members substantially at right angles thereto, a bolt passing through said sleeve, link members engaging said bolt and said fork members for movably securing said fork structure to a cycle frame, and a spring having its opposite ends rigidly secured to said plate and said cycle frame respectively.

In testimony whereof I affix my signature.

JOSEPH FRED MERKEL.